United States Patent

Ikekawa et al.

[11] 3,910,938
[45] Oct. 7, 1975

[54] BERBINE DERIVATIVES

[75] Inventors: Tetsuro Ikekawa, Narashino; Fumitake Shimada, Iwatsuki; Yoshimi Okazaki, Tokyo; Koichi Tachibana, Ohmiya; Norio Aikawa, Settsu, all of Japan

[73] Assignees: Kanebo, Ltd., Tokyo; Tetsuro Ikekawa, Chiba, both of Japan

[22] Filed: Jan. 16, 1974

[21] Appl. No.: 433,712

[30] Foreign Application Priority Data
Jan. 27, 1973  Japan.............................. 48-11145
May 9, 1973   Japan.............................. 48-51968
May 11, 1973  Japan.............................. 48-52855

[52] U.S. Cl....... 260/295 A; 260/295.5 P; 260/999; 424/263
[51] Int. Cl.$^2$....................................... C07D 471/00
[58] Field of Search ................. 260/295 A, 295.5 P

[56] References Cited
UNITED STATES PATENTS
3,590,074   6/1971   Heiss et al...................... 260/479 C OTHER PUBLICATIONS
Hideomi et al., Chemical Abstracts 73:86087a (1970).
Sadykov et al., Chemical Abstracts 67:82289w (1967).
Dultsing et al., Chemical Abstracts 66:9923c (1967).
Gheorghiu et al., Chemical Abstracts 74:110201b (1971).

Primary Examiner—Norman A. Drezin
Attorney, Agent, or Firm—James C. Haight

[57] ABSTRACT

Novel berbine derivatives of the formula:

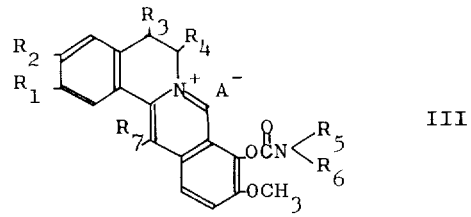

III wherein $R_1$ and $R_2$ represent each a methoxy group or jointly a methylenedioxy group; $R_3$ and $R_4$ represent each a hydrogen atom or jointly a direct bond; $R_5$ and $R_6$ represent, the same or different, a hydrogen atom, a lower alkyl or a phenyl group; $R_7$ represents a hydrogen atom or a lower alkyl group; A represents a pharmaceutically acceptable anion. The compounds inhibit the growth of transplanted sarcoma strain in mice.

25 Claims, No Drawings

BERBINE DERIVATIVES

This invention relates to novel berbine derivatives of the formula:

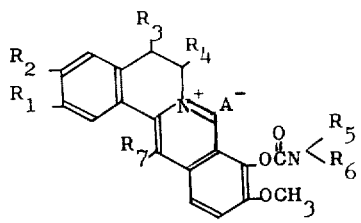

wherein $R_1$ and $R_2$ represent each a methoxy group or jointly a methylenedioxy group; $R_3$ and $R_4$ represent each a hydrogen atom or jointly a direct bond; $R_5$ and $R_6$ represent, the same or different, a hydrogen atom, a lower alkyl or a phenyl group; $R_7$ represents a hydrogen atom or a lower alkyl group; and A represents a pharmaceutically acceptable anion. It also relates to a process for preparing the same.

According to the present invention, the said compounds III may be prepared by reacting a compound of the formula:

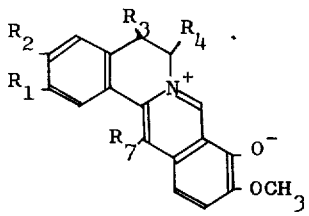

wherein $R_1$, $R_2$, $R_3$, $R_4$ and $R_7$ are as defined above, with an appropriately substituted carbamoyl halide II of the formula:

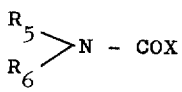

wherein $R_5$, and $R_6$ are as defined above and X is a halogen atom. The starting compounds I are a series of berberrubine, palmatrubine, 5,6-dehydroberberrubine, 5,6-dehydropalmatrubine and their 13-lower alkyl derivatives. They have been partly described in the literature [E. Späth and G. Burger, Ber. 59, 1489 (1926)] and are easily prepared by heating berberine chloride, palmatine chloride, 5,6-dehydroberberine chloride, 5,6-dehydropalmatine chloride or their 13-lower alkyl derivatives at a temperature of 190° to 200°C in the atmosphere of an inert gas such as nitrogen or carbon dioxide, in an inert liquid such as liquid paraffin, or in an organic base such as triethylamine, tributylamine, aniline, pyridine, diethanolamine, triethanolamine or urea. As the substituted carbamoyl halide, the chloride is preferable though other halides such as the bromide or iodide may be used.

The reaction between the compounds I and II proceeds even at room temperature preferably in an inert solvent such as chloroform or benzene in the presence of an acid-acceptor such as pyridine, trimethylamine or triethylamine. It is also preferable to use the carbamoyl halide in excess.

Alternatively, the compound III wherein one of $R_5$ and $R_6$ is a hydrogen atom, and the other is a lower alkyl or phenyl group may be prepared by reacting a salt of a compound I of the formula:

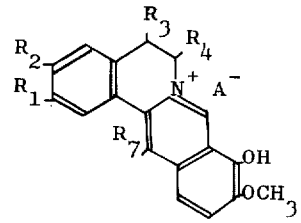

wherein $R_1$, $R_2$, $R_3$, $R_4$, $R_7$ and A are as defined, with a lower alkylisocyanate or phenylisocyanate in the same manner as above. Mixtures of compound I with equivalent quantities of the acid may be used in place of the salt of compound I. As the salt of compound I, pharmaceutically acceptable acid addition salts such as chloride, bromide, iodide, sulfate, phosphate, acetate, citrate, succinate or the like may be used.

The resulting compound III may be recovered from the reaction mixture by a conventional means. For example, the reaction mixture is concentrated in vacuo to remove the solvent and the resulting crystals are collected as a crude product. The crude product may be further purified by a conventional means such as recrystallization from acetone or ethanol, or column chromatography.

Examples of novel berbine derivatives of the present inventions are as follows:

9-methylcarbamoylberberrubine chloride;
9-dimethylcarbamoylberberrubine chloride;
9-diethylcarbamoylberberrubine chloride;
9-diphenylcarbamoylberberrubine chloride;
9-(4'-chlorophenylcarbamoyl) berberrubine chloride;
9-(4'-chlorophenylcarbamoyl) berberrubine phosphate;
9-methylcarbamoyl-13-methylberberrubine chloride;
9-phenylcarbamoyl-13-methylberberrubine chloride;
9-diethylcarbamoyl-13-methylberberrubine chloride;
9-methylcarbamoylpalmatrubine chloride;
9-dimethylcarbamoylpalmatrubine chloride;
9-diethylcarbamoylpalmatrubine chloride;
9-diphenylcarbamoylpalmatrubine chloride;
9-methylcarbamoyl-13-methylpalmatrubine chloride;
9-diphenylcarbamoyl-13-ethylpalmatrubine chloride;
9-(4'-chlorophenylcarbamoyl)-palmatrubine chloride;
9-(4'-chlorophenylcarbamoyl)-13-methylpalmatrubine chloride;
9-methylcarbamoyl-5,6-dehydroberberrubine anionide;
9-diphenylcarbamoyl-5,6-dehydro-13-methylpalmatrubine chloride;
9-phenylcarbamoyl-5,6-dehydropalmatrubine chloride.

The novel berbine derivatives of the present invention effectively inhibit the growth of transplanted sarcoma or leukemia strain in mice. For example, sarcoma strain S-180 or leukemia strain L-1210 was transplanted to peritoneum of mice and the test compound was administered intraperitoneally to mice once a day for consecutive 5 days. The effectiveness of the test compound against the sarcoma strain was judged by comparing the total volume of sarcoma cells collected from abdominal ascites accumulated for one week between the treated group and the control group. In case of leukemia strain, the average survival time, (in days) was compared between the treated group and the control group.

The results obtained are shown in the following Table.

EXAMPLE 2

9-dimethylcarbamoylberberrubine chloride 5g of N-dimethylcarbamyl chloride was added to a solution of 10g of berberrubine in 500 ml of chloroform and 5 ml of pyridine. The mixture was allowed to stand overnight at room temperature, concentrated in vacuo to one-third of the original volume and cooled. The resulting crystals were filtered off and recrystallized from ethanol whereby 7.3g of yellow needles of 9-dimethylcarbamoylberberrubine chloride melting at 228°–231°C with decomposition was obtained. The product showed a single spot of Rf = about 0.08 on the

| Compound | Sarcoma Strain 180 | | Leukemia Strain 1210 | |
|---|---|---|---|---|
| | Dose(mg/kg/day) | Growth rate(%) | Dose(mg/kg/day) | Prolongation rate of Survival time(%) |
| 9-methylcarbamoylberberrubine chloride | 5 × 30 | 0 | 5 × 100 | 148 |
| 9-diethylcarbamoylberberrubine chloride | do. | 57 | do. | 132 |
| 9-methylcarbamoyl-13-methyl-berberrubine chloride | do. | 0 | do. | — |
| 9-phenylcarbamoyl-13-methyl-berberrubine chloride | do. | 0 | do. | — |
| 9-diethylcarbamoyl-13-methyl-berberrubine chloride | do. | 47 | do. | 146 |
| 9-methylcarbamoylpalmatrubine chloride | do. | 0 | do. | 140 |
| 9-diethylcarbamoylpalmatrubine chloride | do. | 60 | do. | 130 |
| 9-methylcarbamoyl-13-methyl-palmatrubine chloride | do. | 0 | do. | 150 |
| 9-(4'-chlorophenylcarbamoyl)-palmatrubine chloride | do. | — | do. | 120 |
| 9-methylcarbamoyl-5,6-dehydro-berberrubine phosphate | do. | 2 | do. | 155 |
| 9-diphenylcarbamoyl-5,6-dehydro-13-methyl palmatrubine chloride | do. | 0 | do. | 142 |
| Control | — | 100 | — | 100 | the compounds III of the present invention may be used for chemotherapy of transplanted sarcoma S-180 or leukemia L-1210 in mice in the form a pharmaceutical composition comprising an effective amount of one of said compounds in association with a pharmaceutically acceptable carrier. In this connection, said compounds III are very advantageous because of their higher solubility in water. Thus parenteral solutions are prepared in the conventional way and filled into vials or ampoules. Other forms of administration include tablets, or capsules which are also prepared in the conventional way in association with known excipients.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

9-methylcarbamoylberberrubine chloride 4g of N-methylcarbamyl chloride was added to a solution of 10g of berberrubine in a mixture of 500 ml of chloroform and 5 ml of pyridine, and the mixture was allowed to stand overnight at room temperature. The resulting crystals were filtered off and recrystallized from acetone whereby 6.3g of yellow needles of 9-methylcarbamoylberberrubine chloride melting at 265°–267°C with decomposition was obtained. $\nu c$ =o, 1,740cm$^{-1}$.

thin layer chromatography (Silica gel G, methanol:water = 3:1). $\nu c$ = o, 1,715cm$^{-1}$.

EXAMPLE 3

9-diethylcarbamoylberberrubine chloride 6.5g of N, N-diethylcarbamyl chloride was added to a solution of 10g of berberrubine in 500 ml of chloroform and 5 ml of pyridine. The mixture was allowed to stand overnight at room temperature, concentrated in vacuo to one third of the original volume and cooled. The resulting crystals were filtered off and recrystallized from ethanol whereby 7.5g of yellow needles of 9-diethylcarbamoylberberrubine chloride melting at 228° – 230°C with decomposition was obtained. The product showed a single spot of Rf = about 0.11 on the thin layer chromatography (Silica gel G, methanol:water = 3:1). $\nu c$ =o, 1,720cm$^{-1}$.

EXAMPLE 4

9-diphenylcarbamoylberberrubine chloride 8.5g of N, N-diphenylcarbamyl chloride was added to a solution of 10g of berberrubine in 500 ml of chloroform and 5 ml of pyridine. The mixture was allowed to stand overnight at room temperature, concentrated in vacuo to one half of the original volume and cooled. The resulting crystals were filtered off and recrystallized from ethanol whereby 11.5g of yellow needles of 9-diphenylcarbamoylberberrubine chloride melting at 225°– 228°C with decomposition was obtained. The product showed a single spot of Rf = about 0.12 on the thin layer chromatography (Silica gel G, methanol:water = 3:1). $\nu c$ = o, 1,710cm$^{-1}$.

EXAMPLE 5

9-(4'-chlorophenylcarbamoyl) berberrubine chloride a. A solution of 5g of N-(p-chlorophenyl) carbamyl chloride in 50 ml of chloroform was added to a solution of 10g of berberrubine in 800 ml of chloroform and 10 ml pyridine dropwise with stirring. The mixture was allowed to stand overnight at room temperature, concentrated in vacuo to one third of the original volume and cooled. The resulting crystals were filtered off and recrystallized from chloroform whereby 8.2g of yellow needles of 9-(4'-chlorophenylcarbamoyl) berberrubine chloride melting at 252° – 254°C with decomposition was obtained. $\nu c$ = o, 1750cm$^{-1}$ b. To a suspension of 1g of berberrubine chloride in 150 ml of chloroform and 5 ml of pyridine was added a solution of 1g of p-chlorophenylisocyanate in a small amount of chloroform dropwise at room temperature. The mixture was stirred for 8 hours at the same temperature and concentrated in vacuo. The resulting crystals were recrystallized from chloroform whereby 0.68g of 9-(4'-chlorophenylcarbamoyl) berberrubine chloride was obtained. The product showed no depression of melting point when mixing with the product as obtained above and identified with the latter by the infrared spectra.

EXAMPLE 6

9-methylcarbamoyl-13-methylberberrubine chloride 0.8g of N-methylcarbamyl chloride was added to a solution of 3.0g of 13-methylberberrubine in 80 ml of chloroform and 10 ml of pyridine. The mixture was refluxed for 1 hour, concentrated in vacuo and then cooled. The resulting crystals were filtered off and recrystallized from chloroform-benzene mixture whereby 2.3g of yellow crystals of 9-methylcarbamoyl-13-methylberberrubine chloride melting at 284° – 287°C was obtained. $\nu c$ = o, 1750cm$^{-1}$

EXAMPLE 7

9-diethylcarbamoyl-13-methylberberrubine chloride

To a solution of 3.0g of 13-methylberberrubine in 80 ml of chloroform and 10 ml of pyridine was added a solution of 1.0g of N, N-diethylcarbamyl chloride in 10 ml of chloroform. The mixture was refluxed for 3 hours, concentrated in vacuo and then cooled. The resulting crystals were filtered off and recrystallized from ethanol whereby 1.8g of yellow needles of 9-diethylcarbamoyl-13-methylberberrubine chloride melting at 202° –205°C with decomposition was obtained. The product showed a single spot of Rf=about 0.15 on the thin layer chromatography (Silica gel G, methanol:water=3:1). $\nu c$ = o, 1730cm$^{-1}$.

EXAMPLE 8

9-phenylcarbamoyl-13-methylberberrubine chloride a. To a solution of 3.0g of 13-methylberberrubine in 80 ml of chloroform and 10 ml of pyridine was added a solution of 1.1g of N-phenylcarbamyl chloride in 10 ml of chloroform dropwise. The mixture was refluxed for 1 hour, concentrated in vacuo and then cooled. The resulting crystals were filtered off and recrystallized from chloroform-benzene mixture whereby 1.8g of yellow needles of 9-phenylcarbamoyl-13-methylberberrubine chloride melting at 273° – 275°C with decomposition was obtained. $\nu c$ = o, 1,750cm$^{-1}$.

b. To a suspension of 1.0g of 13-methylberberrubine chloride in 120 ml of chloroform and 5 ml of pyridine was added a solution of 0.7g of phenylisocyanate in a small amount of chloroform dropwise at room temperature. The mixture was stirred for 8 hours and concentrated in vacuo. The resulting crystals were recrystallized from chloroform-benzene mixture whereby 0.62g of 9-phenylcarbamoyl-13-methylberberrubine chloride was obtained. The product showed no depression of melting point when mixing with the product obtained above and identified with the latter by the infrared spectra.

EXAMPLE 9

9-methylcarbamoylpalmatrubine chloride

To a solution of 10g of palmatrubine in 70 ml of chloroform and 1 ml of pyridine was added 4.0g N-methylcarbamyl chloride. The mixture was allowed to stand overnight at room temperature. The resulting crystals were filtered off and recrystallized from chloroform whereby 6.5g of yellow needles of 9-methylcarbamoyl-palmatrubine chloride melting at 248° – 250°C with decomposition was obtained. $\nu c$ = o, 1,750cm$^{-1}$.

EXAMPLE 10

9- dimethylcarbamoylpalmatrubine chloride 5g of N, N-dimethylcarbamyl chloride was added to a solution of 10.0g of palmatrubine in 50 ml of chloroform and 5 ml of pyridine. The mixture was allowed to stand overnight at room temperature, concentrated in vacuo and then cooled. The resulting crystals were filtered off and recrystallized from ethanol whereby 8.4g of yellow needles of 9-dimethylcarbamoylpalmatrubine chloride melting at 222° – 224°C with decomposition was obtained. The product showed a single spot of Rf = about 0.07 on the thin layer chromatography (Silica gel G, methanol:water = 3:1). $\nu c$ = o, 1,720cm$^{-1}$.

EXAMPLE 11

9-diethylcarbamoylpalmatrubine chloride 6.5g of N, N-diethylcarbamyl chloride was added to a solution of 10.0g of palmatrubine in 50 ml of chloroform and 5 ml of pyridine. The mixture was allowed to stand overnight at room temperature, concentrated in vacuo and cooled. The resulting crystals were filtered off and recrystallized from ethanol whereby 7.5g of yellow needles of 9-diethylcarbamoylpalmatrubine chloride melting at 226° – 228°C with decomposition was obtained. The product showed a single spot of Rf = about 0.11 on the thin layer chromatography (Silica gel G, methanol:water = 3:1). $\nu c$ = o, 1,720cm$^{-1}$.

EXAMPLE 12

9-diphenylcarbamoylpalmatrubine chloride

To a solution of 10.0g of palmatrubine in 50 ml of chloroform and 5 ml of pyridine was added a solution of 8.5g of N, N-diphenylcarbamyl chloride in 50 ml if chloroform. The mixture was allowed to stand overnight at room temperature, concentrated in vacuo and then cooled. The resulting crystals were filtered off and recrystallized from ethanol whereby 11.5g of yellow needles of 9-diphenylcarbamoylpalmatrubine chloride melting at 212° – 214°C with decomposition was obtained. The product showed a single spot of Rf = about 0.08 on the thin layer chromatography (Silica gel G, methanol:water = 3:1). $vc = o$, 1,720cm$^{-1}$.

EXAMPLE 13

9-(4'-chlorophenylcarbamoyl) palmatrubine chloride a. To a solution of 10.0g of palmatrubine in 50 ml of chloroform and 10 ml of pyridine was added a solution of 5.0g of p-chlorophenycarbamyl chloride in 50 ml of chloroform dropwise with stirring. The mixture was allowed to stand overnight at room temperature, concentrated in vacuo and then cooled. The resulting crystals were filtered off and recrystallized from chloroform whereby 8.2g of yellow needles of 9-(4'-chlorophenylcarbamoyl) palmatrubine chloride melting at 250° – 252°C with decomposition was obtained. $vc = o$, 1,750cm$^{-1}$ b. 1.0g of palmatrubine chloride was suspended in a mixture of 150 ml of chloroform and 5 ml of pyridine. To the suspension was added a solution 1g of p-chlorophenylisocyanate in a small amount of chloroform dropwise at room temperature. The suspension was stirred at the same temperature for 8 hours, concentrated in vacuo and cooled. The resulting crystals were filtered off and recrystallized from chloroform whereby 0.68g of 9-(4'-chlorophenylcarbamoyl)-palmatrubine chloride was obtained. The product showed no depression of melting point when mixing with the product as obtained above and identified with the latter by infrared spectra.

EXAMPLE 14

9-methylcarbamoyl-13-methylpalmatrubine chloride 4g of N-methylcarbamyl chloride was added to a solution of 10.0g of 13-methylpalmatrubine in 50 ml of chloroform and 5 ml of pyridine. The mixture was allowed to stand overnight at room temperature. The resulting crystals were filtered off and recrystallized from acetone whereby 6.1g of yellow needles of 9-methylcarbamoyl-13-methylpalmatrubine chloride melting at 260° – 262°C with decomposition was obtained. $vc = o$, 1,740cm$^{-1}$.

EXAMPLE 15

9-diphenylcarbamoyl-13-ethylpalmatrubine chloride

To a solution of 10g of 13-ethylpalmatrubine in 50 ml of chloroform and 5 ml of pyridine was added in a solution of 8.5g of N, N-diphenylcarbamyl chloride in 50 ml of chloroform. The mixture was allowed to stand overnight, concentrated in vacuo and cooled. The resulting crystals were filtered off and recrystallized from ethanol whereby 10.5g of yellow needles of 9-diphenylcarbamoyl-13-ethylpalmatrubine chloride melting at 214° – 216°C with decomposition was obtained. The product showed a single spot of Rf=about 0.10 on the thin layer chromatography (Silica gel G, methanol:water = 3:1). $vc = o$, 1,710cm$^{-1}$.

EXAMPLE 16

9-(4'-chlorophenylcarbamoyl)-13-methylpalmatrubine chloride 1g of 13-methylpalmatrubine chloride was suspended in 50 ml of chloroform and 5 ml of pyridine. To the suspension was added a solution of 1g of p-chlorophenylisocyanate in a small amount of chloroform dropwise at room temperature. The mixture was stirred at room temperature for 8 hours, concentrated in vacuo and then cooled. The resulting crystals were filtered off and recrystallized from chloroform whereby 0.6g of 9-(4'-chlorophenylcarbamoyl)-13-methylpalmatrubine chloride melting at 258° – 260°C with decomposition was obtained. $vc = o$, 1750cm$^{-1}$.

EXAMPLE 17

9-(4'-chlorophenylcarbamoyl) berberrubine phosphate

To a suspension of 5g of berberrubine phosphate in 700 ml of chloroform and 25 ml of pyridine was added a solution of 5g of p-chlorophenylisocyanate in 15 ml of chloroform dropwise at room temperature under stirring. The mixture was stirred at the same temperature for 8 hours, concentrated in vacuo and then cooled. The resulting crystals were filtered off and recrystallized from chloroform whereby 3.1g of 9-(4'-chlorophenylcarbamoyl)-berberrubine phosphate melting at 259° – 262°C with decomposition was obtained. $vc = o$, 1,750cm$^{-1}$.

1.0g of the phosphate was dissolved in 10 ml of methanol and 2.0 ml of concentrated hydrochloric acid was added dropwise to the solution at room temperature with stirring. The mixture was stirred for additional 10 minutes and then evaporated in vacuo to remove methanol. The resulting crystals were filtered off, washed with a small amount of methanol and dried whereby 0.7g of orange crystals of 9-(4'-chlorophenylcarbamoyl) berberrubine chloride melting at 252° – 254°C with decomposition was obtained. The product is identical to the product of Example 5.

EXAMPLE 18

9-methylcarbamoyl-5,6-dehydroberberrubine chloride 2g of N-methylcarbamyl chloride was added to a solution of 5g of 5,6-dehydroberberrubine in 250 ml of chloroform and 2.5 ml of pyridine. The mixture was allowed to stand overnight at room temperature. The resulting crystals were filtered off and recrystallized from acetone whereby 3.0g of 9-methylcarbamoyl-5, 6-dehydroberberrubine chloride melting at 270°C with decomposition was obtained. $vc = o$, 1,740cm$^{-1}$.

1.0g of the chloride thus prepared was dissolved in methanol and the solution was passed through a column of an anion-exchange resin previously treated with phosphoric acid. The elute was concentrated in vacuo and cooled whereby 0.7g of crystals of 9-methylcarbamoyl-5, 6-dehydroberberrubine phosphate decomposing at 273 – 275°C was obtained.

EXAMPLE 19

9-diphenylcarbamoyl-5,6-dehydro-13-methylpalmatrubine chloride 3.5g of N, N-diphenylcarbamyl chloride was added to a solution of 7.0g of 5,6-dehydro-13-methylpalmatrubine in 350 ml of chloroform and 3.5 ml of pyridine. The mixture was allowed to stand overnight at room temperature, concentrated in vacuo and then cooled. The resulting crystals were filtered off and recrystallized from ethanol whereby 7.2g of 9-diphenylcarbamoyl-5,6-dehydro-13-methylpalmatrubine chloride decomposing at 230° – 233°C was obtained. $vc = o$, 1,720cm$^{-1}$.

EXAMPLE 20

9-phenylcarbamoyl-5,6-dehydropalmatrubine chloride

To a solution of 1.0g of 5,6-dehydropalmatrubine chloride in 150 ml of chloroform and 5 ml of pyridine was added a solution of 0.7g of phenylisocyanate in 3 ml of chloroform dropwise at room temperature with stirring. The mixture was stirred at the same temperature for 8 hours, concentrated in vacuo and then cooled. The resulting crystals were filtered off and recrystallized from chloroform-benzene mixture whereby 0.6g of 9-phenylcarbamoyl-5,6-dehydropalmatrubine chloride decomposing at 242°– 245°C was obtained. $\nu c = o$, 1,750cm$^{-1}$.

Various other examples and modifications of the foregoing examples can be devised by the person skilled in the art after reading the foregoing disclosure and the appended claims without departing from the spirit and scope of the invention. All such examples and modifications thereof are included within the scope of said claims.

What is claimed is:

1. A berbine derivative of the formula:

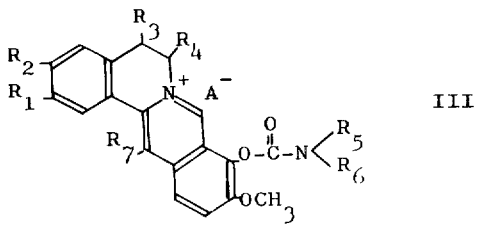

wherein $R_1$ and $R_2$ represent each a methoxy group or jointly a methylenedioxy group; $R_3$ and $R_4$ represent each a hydrogen atom or jointly a direct bond; $R_5$ and $R_6$ represent, the same or different, a hydrogen atom, a lower alkyl or phenyl group; $R_7$ represent a hydrogen atom or a lower alkyl group; and A represent a pharmaceutically acceptable anion.

2. As the compound according to claim 1, 9-methylcarbamoylberberrubine chloride.

3. As the compound according to claim 1, 9-dimethylcarbamoylberberrubine chloride.

4. As the compound according to claim 1, 9-diethylcarbamoylberberrubine chloride.

5. As the compound according to claim 1, 9-diphenylcarbamoylberberrubine chloride.

6. As the compound according to claim 1, 9-(4'-chlorophenylcarbamoyl) berberrubine anionide.

7. As the compound according to claim 1, 9-methylcarbamoyl-13-methylberberrubine chloride.

8. As the compound according to claim 1, 9-phenylcarbamoyl-13-methylberberrubine chloride.

9. As the compound according to claim 1, 9-diethylcarbamoyl-13-methylberberrubine chloride.

10. As the compound according to claim 1, 9-methylcarbamoylpalmatrubine chloride.

11. As the compound according to claim 1, 9-dimethylcarbamoylpalmatrubine chloride.

12. As the compound according to claim 1, 9-diethylcarbamoylpalmatrubine chloride.

13. As the compound according to claim 1, 9-diethylcarbamoylpalmatrubine chloride.

14. As the compound according to claim 1, 9-diphenylcarbamoylpalmatrubine chloride.

15. As the compound according to claim 1, 9-methylcarbamoyl-13-methylpalmatrubine chloride.

16. As the compound according to claim 1, 9-diphenylcarbamoyl-13-ethylpalmatrubine chloride.

17. As the compound according to claim 1, 9-(4'-chlorophenylcarbamoyl) palmatrubine chloride.

18. As the compound according to claim 1, 9-(4'-chlorophenylcarbamoyl)-13-methylpalmatrubine chloride.

19. As the compound according to claim 1, 9-methylcarbamoyl-5,6-dehydroberberrubine anionide.

20. As the compound according to claim 1, 9-diphenylcarbamoyl-5,6-dehydro-13-methylpalmatrubine chloride.

21. As the compound according to claim 1, 9-phenylcarbamoyl-5,6-dehydropalmatrubine chloride.

22. A berbine derivative according to claim 1, wherein $R_1$ and $R_2$ are each methoxy.

23. A berbine derivative according to claim 1, wherein $R_1$ and $R_2$ jointly form methylenedioxy.

24. A berbine derivative according to claim 1, wherein $R_3$ and $R_4$ are each a hydrogen atom.

25. A berbine derivative according to claim 1, wherein each lower alkyl is methyl.

* * * * *